United States Patent Office 2,964,446
Patented Dec. 13, 1960

2,964,446

1,4 - BIS(β-HYDROXYETHYLAMINOMETHYL)-2,3,5, 6-TETRAMETHYLBENZENE AND METAL SALT COMPLEXES THEREOF

Joseph W. Nemec, Abington, and Edward L. Wolffe, Willow Grove, Pa., assignors to Rohm & Haas Company, Philadelphia, Pa., a corporation of Delaware No Drawing. Filed Sept. 2, 1958, Ser. No. 758,591

5 Claims. (Cl. 167—30)

The present invention concerns a new bis-aminoalcohol and the metal salt complexes thereof.

The structure of this new bis-aminoalcohol and the metal salt complexes thereof are, respectively, as follows:

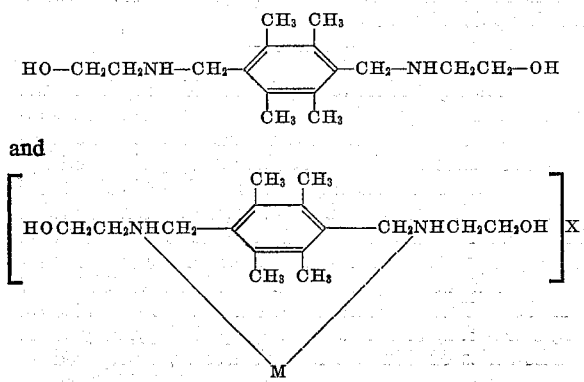

in which formula M is a cation selected from the group consisting of cupric, ferric, and nickelous ions and X is equivalents of a monovalent anion or two equivalents of a divalent anion.

Complexes of N-hydroxyalkyl-N-benzylamines with metal salts such as those of copper, nickel, cadmium and zinc have been previously described which have exhibited fungicidal activity. While the fungicidal activity of these compounds is satisfactory, they are liquids or at most mushy solids, and, thus, cannot be obtained as finely divided solids. Thus, they are unsuitable for many applications, such as, for instance, application as a fungicidal dust.

An object of this invention is the preparation of compounds showing a high degree of fungicidal activity.

A further object of this invention is the preparation of high melting solid compounds with a high degree of fungicidal activity and in such a physical state that they can be readily incorporated into fungicidal compositions for application by dusting.

At least four factors are important in determining the suitability of a given compound as a fungicide, namely, high fungitoxicity aaginst a broad spectrum of fungi, good tenacity, low phytotoxicity against the plant host, and good stability. The necessity for high fungitoxicity against a broad spectrum of fungi is obvious, but the three other factors are also of very real importance in determining the economic suitability of a given fungicide. Some compounds otherwise suitable as fungicides are defficient in tenacity, thus they are expensive to use because of their fungitive nature and the necessity for repeated applications. Other compounds, while exhibiting a high degree of fungitoxcity, cannot be used because they are also highly phytotoxic, causing serious damage to plants treated therewith. It has been found that some compounds exhibit suitable fungicidal activity when employed indoors under laboratory or greenhouse conditions, but exhibit appreciably less and economically unsatisfactory fungicidal activity when employed under field conditions.

While the foregoing discussion pertains specifically to fungicides for use on plants, many of the criteria discussed above are also pertinent when assessing the value of the compounds for broader use as general purpose fungicides. Thus, for the protection of porous fibrous substrates, such as fabric, paper, belting leather, etc., against fungal growth, chemical stability, and stability to ultraviolet light are also important properties. In many cases, low water-solubility is required in those applications in which permanence is important.

Surprisingly, it has been found that the metal salt complexes of 1,4 - bis(β-hydroxyethylaminoethyl)-2,3,5,6-tetramethylbenzene are high-melting solids which can readily be pulverized and which exhibit high fungitoxicity.

1,4 - bis(β-hydroxyethylaminomethyl) - 2,3,5,6-tetramethylbenzene can be prepared by reacting 1,4-bis-chloromethyl)-2,3,5,6-tetramethylbenzene with β-aminoethanol. The trivial name for 2,3,5,6-tetramethylbenzene is durene, and this nomenclature may be used interchangeably hereinafter. The 1,4-bis(β - hydroxyethyl-aminoethyl)-2,3,5,6-tetramethylbenzene so produced can be reacted with a metal salt to form the metal salt complex.

The reaction between 1,4-bis-(chloromethyl)-2,3,5,6-tetramethylbenzene and β-aminoethanol theoretically requires four moles of β-aminoethanol per mole of 1,4-bis-(chloromethyl)-2,3,5,6-tetramethylbenzene, two moles of β-aminoethanol being required to react with the two moles of hydrogen chloride which are split off during the reaction. In actual practice, it is preferred to use a substantial excess of the β-aminoethanol to insure complete reaction of the substituted benzene. Thus, from about 6 to about 12 moles of β-aminoethanol may be used per mole of substituted benzene, with 10 moles per mole being the preferred. Not only does this excess insure complete reaction of the substituted benzene, but the excess permits running the reaction without the addition of other solvents. The use of other solvents which are not chemically reactive under the reaction conditions employed is, however, still within the scope of the present invention.

The metal salt complexes are prepared by the interaction of the 1,4-bis-aminoalcohol with cupric, ferric and nickelous salts. The preferred class of solvents for this reaction is the lower alkanols, methanol, ethanol and propanol, with ethanol being the most preferred embodiment. Thus, in the preferred embodiment of this invention, 1,4-bis(β-hydroxyethylaminomethyl)durene is dissolved in ethanol and the solution is heated to reflux temperature. The metal salt is dissolved in ethanol and the solution rapidly added to the refluxing ethanolic solution of 1,4-bis(β-hydroxyethylaminomethyl)durene. The complex forms rapidly and precipitates completely on cooling.

Although the complexes will form slowly at room temperature, moderate heating, such as at the boiling point of ethanol, is preferred to speed the reaction to completion.

Although the molar ratios of the metallic salts to 1,4-bis(β-hydroxyethylaminomethyl) - 2,3,5,6 - tetramethylbenzene can be varied widely and still produce the products of the invention, the preferred ratio is 1 mole to 1 mole.

Various anions are suitable as the anion portion of the divalent metallic salts of nickel, iron, and copper used in the preparation of the new compounds of this invention. Anions such as chlorides, bromides, iodides, sulfates, nitrates, selenates, citrates, formates, acetates, and propionates can be employed, since it appears that the anion portion of the complex does not measurably affect the fungicidal activity of the complex. The preferred anions are the chlorides, bromides, sulfates, nitrates, and acetates, since such metallic salts exhibit good water and lower-alkanol solubility. The chlorides, sulfates, and acetates of the desired metals are most commonly employed because of their high solubilities and ready commercial availability.

The compounds of the present invention can be formulated into fungicidal preparations employing methods well-known to those skilled in the art. In the preparation of sprays for agricultural or horticultural use, the compound may be formulated in a nonphytotoxic solvent, or a mixture of non-phytotoxic solvents, together with an emulsifying agent which permits dispersion of the fungicidal preparation in water. Dusts may be prepared by taking up the compound, after formulating in solvent, with a finely divided solid, such as magnesium carbonate, talc, pyrophyllite, clay, magnesium aluminum silicate or other acceptable carriers. Wetting agents, sticking agents or dispersing agents may be sued in such sprays and/or dusts.

Because of the very high melting points of the complexes of the present invention, they can be readily ground to very fine particle size. The powder so produced can then be blended with inert fillers, such as clays, pyrophyllite, etc., by tumbling therewith or by employing other mixing methods well-known in the art.

An application rate of one to three pounds of active ingredient per acre gives satisfactory fungicidal activity. Dusts may contain about 1 to 15 percent of one or more of the 1,4-bis($\beta$-hydroxyethylaminomethyl)-2,3,5,6-tetramethylbenzene metal salt complexes. A typical composition is as follows:

5 parts of hereinbefore described complex (finely ground),
50 parts magnesium aluminum silicate (Diluex)
45 parts pyrophyllite Wettable powders are frequently used and a typical formulation is:

25 parts of hereinbefore-described complex (finely ground),
48 parts Diluex,
24 parts pyrophyllite,
1 part condensed sodium naphthalene sulfonate-formaldehyde,
2 parts octylphenoxypolyethoxyethanol.

The following examples set forth certain well-defined instances of the application of this invention. They are not, however, to be considered as limitations thereof, since many modifications may be made without departing from the spirit and scope of this invention.

Unless otherwise specified, all parts are parts by weight.

*Example I*

One mole of 1,4-bis(chloromethyl)durene and 10 moles of monoethanolamine were introduced into a vessel equipped with an agitator and heated slowly to 150° C. while agitating. Agitation was continued, and the reaction mixture was maintained at 150° C. for one hour and then cooled to about 80° C. A thick slurry resulted. An equal volume of cold water was added to the reaction mixture to dissolve the resulting monoethanolamine hydrochloride; it was stirred and then filtered. The cake was recrystallized from water, washed with ether, and air-dried. A 60% yield of essentially pure, 1,4-bis($\beta$-hydroxyethylaminomethyl)durene (I) was obtained. Melting point, 151.5° to 152.5° C.; percent nitrogen, 10.0% calculated, 10.0% found.

*Example II*

One mole of (I), prepared as set forth in Example I, was dissolved in 1500 cc. of refluxing absolute ethanol and a solution of 1 mole of anhydrous cupric chloride in 800 cc. of absolute ethanol was added rapidly. The solid complex formed immediately, and the ethanol was removed by filtration. This material, 1,4-bis($\beta$-hydroxyethylaminomethyl)durene-cupric chloride, was a light green solid with a melting point above 200° C.

*Example III*

An equimolar quantity of ferric chloride was substituted for the cupric chloride used in Example II, and the reaction was carried out as set forth in Example II. The complex, 1,4-bis($\beta$-hydroxyethylaminomethyl)durene-ferric chloride, was a reddish solid with a melting point above 200° C.

*Example IV*

An equimolar quantity of nickelous chloride was substituted for the cupric chloride of Example II, and the reaction was carried out as set forth in Example II. The complex so formed, 1,4-bis($\beta$-hydroxyethylaminomethyl)-durene-nickelous chloride, was a light blue solid with a melting point above 300° C.

*Example V*

Equimolar quantities of cupric bromide, cupric sulfate, cupric nitrate, cupric citrate and cupric acetate were substituted for the cupric chloride of Example II. The complexes so formed exhibited satisfactory fungicidal activity.

The three complexes prepared as set forth in Examples II, III, and IV were examined for their fungitoxic activity. The method utilized for the determination of fungitoxic activity was one standardized by the American Phytopathological Society, Committee on Standardization of Fungicidal Tests. All details of this test are presented on pages 627–632, volume 33 of Phytopathology, July 1943.

The series of dilutions for this test were prepared by dissolving 1 gram of each of the compounds in 20 cc. of acetone and then adding 79 cc. of water to make a 1% solution of the compound. This stock solution was then serially diluted with water to concentrations of 0.1%, 0.01%, and 0.005%.

A spore suspension of *Monilinia fructicola* (M.f.) or *Stemphylium sarcinaeforme* (S.s.) in an amount of 0.5 cc. was added to 2 cc. of each of the different serial dilutions and 4 drops of each of the resulting suspensions were pipetted onto individual cellulose nitrate coated glass slides. These slides were then placed in large Petri plates, sealed with water, and held at a constant temperature for a period of 16 to 24 hours, at which time the percentage of spores showing no germination was determined. This was done by counting 25 spores in the center of each of the 4 drops on each slide with the proper correction being made for non-viable spores as determined by the control (untreated) slides in each chamber. *Stemphylium sarcinaeforme* spores were standardized to 5,000 and *Monilinia fructicola* to 10,000 per ml. in these tests. The data obtained were then plotted on logarithmic probability paper and straight line curves were drawn by inspection. The $LD_{50}$ values were determined by extrapolation. This value is the concentration at which 50 percent of the test spores would be prevented from germinating.

The results of these tests were as follows:

| Dilution | .1% | .01% | .005% | $LD_{50}$ (p.p.m.) |
|---|---|---|---|---|
| | Percent Kill | | | |
| M.f.: | | | | |
| Nickelous complex | 100 | 100 | 65 | 5–10 |
| Cupric complex | 100 | 100 | 100 | 5 |
| Ferric complex | 100 | 83 | 11 | 50–100 |
| S.s.: | | | | |
| Nickelous complex | 100 | 10 | 0 | 100–1,000 |
| Cupric complex | 100 | 100 | 100 | 10–50 |
| Ferric complex | 100 | 91 | 0 | 50–100 |

We claim:
1. Complexes formed by the interaction in a lower alkanol solution of one mole of 1,4-bis(β-hydroxyethylaminomethyl)-2,3,5,6-tetramethylbenzene with one mole of a water-soluble and lower alkanol soluble metal salt having as cation a member selected from the group consisting of ferric, cupric and nickelous ions.

2. A complex formed by the interaction in a lower alkanol solution of one mole of 1,4-bis(β-hydroxyethylaminomethyl)-2,3,5,6-tetramethylbenzene with one mole of cupric chloride.

3. A fungicidal composition containing as the active fungicidal component a complex formed by the interaction in a lower alkanol solution of one mole of 1,4-bis(β-hydroxyethylaminomethyl)-2,3,5,6-tetramethylbenzene with one mole of a metal chloride having as cation a member selected from the group consisting of ferric, cupric and nickelous ions intimately admixed with an inert pesticidal adjuvant therefor.

4. A fungicidal composition containing as the active fungicidal component a complex formed by the interaction in a lower alkanol solution of one mole of 1,4-bis(β-hydroxyethylaminomethyl) - 2,3,5,6 - tetramethylbenzene with one mole of cupric chloride intimately admixed with an inert pesticidal adjuvant therefor.

5. A method of controlling fungus growth which comprises applying to the area to be protected in an amount sufficient to control fungus growth thereon a complex formed by the interaction in a lower alkanol solution of one mole of 1,4-bis(β-hydroxyethylaminomethyl)-2,3,5,6-tetramethylbenzene and one mole of a metal chloride having as cation a member selected from the group consisting of ferric, cupric, and nickelous ions.

References Cited in the file of this patent
UNITED STATES PATENTS

| | | |
|---|---|---|
| 2,178,270 | Sleeper | Oct. 31, 1939 |
| 2,624,760 | Bersworth | Jan. 6, 1953 |
| 2,686,798 | Gmitter | Aug. 17, 1954 |
| 2,790,830 | Bader | Apr. 30, 1957 |